United States Patent [19]

Kurumada et al.

[11] Patent Number: 5,096,948
[45] Date of Patent: Mar. 17, 1992

[54] RESISTANT RESIN COMPOSITIONS

[75] Inventors: Tomoyuki Kurumada; Hisayu Osawa; Toshimasa Toda, all of Tokyo; Hiromi Tomono; Ryuichi Hasegawa, both of Yokkaichi, all of Japan

[73] Assignees: Sankyo Company, Limited; Monsanto Kasei Company, both of Tokyo, Japan

[21] Appl. No.: 542,422

[22] Filed: Jun. 22, 1990

[30] Foreign Application Priority Data

Jul. 3, 1989 [JP] Japan .................................. 1-171665

[51] Int. Cl.$^5$ ................................................ C08K 5/34
[52] U.S. Cl. ........................................ 524/91; 524/99; 524/102
[58] Field of Search ............................ 524/91, 99, 102

[56] References Cited

U.S. PATENT DOCUMENTS

| | | | |
|---|---|---|---|
| 3,625,912 | 12/1971 | Vincent | 524/104 |
| 3,640,928 | 2/1972 | Murayama et al. | 524/102 |
| 4,198,334 | 4/1980 | Rasberger | 524/102 |
| 4,237,294 | 12/1980 | Soma et al. | 524/102 |
| 4,260,689 | 4/1981 | Rody et al. | 524/102 |
| 4,340,533 | 7/1982 | Rody | 524/99 |
| 4,468,488 | 8/1984 | Minagawa et al. | 524/102 |
| 4,816,512 | 3/1989 | Dahms | 524/104 |

Primary Examiner—Kriellion S. Morgan
Attorney, Agent, or Firm—Frishauf, Holtz, Goodman & Woodward

[57] ABSTRACT

The present invention relates to weather resistant resin compositions consisting essentially of at least one polymeric substance and comprising discoloration effective amounts of:
    (i) a hindered amine stabilizer;
    (ii) a hindered-phenol-hindered amine stabilizer; and
    (iii) a UV absorber.

39 Claims, No Drawings

RESISTANT RESIN COMPOSITIONS

BACKGROUND OF THE INVENTION

1. Field of the Invention

The present invention relates to resin compositions adapted for weather, heat and light resistance, and which are also resistant to discoloration.

2. Prior Art

Resin compositions are useful for coating and protecting items subject to weathering, and which are otherwise in some way sensitive to the environment in which they are used. Such coatings may be transparent, but are more often colored, although such coloration is frequently white.

However, the resins themselves, although more resistant than their substrates, are also subject to decomposition by factors such as heat and light. Commonly used resins are based on styrene polymers, especially polystyrene, acrylonitrile-styrene copolymer and acrylonitrile-butadiene-styrene copolymer (ABS type resin).

Research into the problems of decomposition and discoloration has established that copolymers with a maleimide sub-unit have an improved resistance to weathering, and that the maleimide monomer may be used in excess over its comonomers. However, maleimide-containing resin compositions generally need to be molded under at high temperatures, and this can frequently lead to discoloration occurring during the molding process. Furthermore, although improved, maleimide-containing resin compositions still tend to suffer from the drawback of being unstable to light and from being susceptible to discoloration.

Other research has yielded a number of stabilizers, both general and specific to the various adverse factors. Some may prevent discoloration, while others help circumvent the effects of heat. For example, Japanese Unexamined Patent Publication No. 252458/1987 provides hindered amine-type stabilizers, while other publications provide thermal stabilizers and light stabilizers, including phenol, phosphorus and amine compounds.

Other prior art which relates to relevant compounds is, for example, GB-A-1266035 which discloses hindered amine-type stabilizers, wherein one, two or three 2,2,6,6-tetraalkyl-piperidyl groups are linked to a corresponding mono-, di- or tri- acyl group.

EP-A-13 443 discloses a specific range of compounds comprising a 2,2,6,6-tetramethylpiperidine group substituted by hindered phenol groups containing acyls in both the N and the 4-positions.

GB-A-1516780 discloses bis-(2,2,6,6-tetraalkyl-piperidyl) diacyl ester derivatives, particularly where the diacyl group is a malonic group substituted by a hindered phenol residue.

All of the above references and any others referred to herein are incorporated herein by reference.

However, the stabilizers of the prior art do not provide satisfactory protection against discoloration, and there is still a demand for stabilizers having good discoloration preventing properties.

SUMMARY OF THE INVENTION

Accordingly it is an object of the invention to provide resin compositions resistant to weathering.

It is a further object of the invention to provide resin compositions resistant to heat and light.

The present invention provides a resin composition comprising discoloration effective amounts of: (i) a hindered amine stabilizer [Component (A)]; (ii) a hindered-phenol-hindered amine stabilizer [Component (B)]; and (iii) a UV absorber [Component (C)].

DETAILED DESCRIPTION OF THE INVENTION

The resin compositions of the present invention preferably comprise maleimide-type copolymers. By "maleimide-type" is meant a copolymer containing sub-units of the formula (IV)

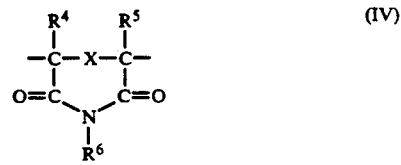

wherein X represents a single bond or a methylene group, $R^4$ and $R^5$ are the same or different, and each represents hydrogen or methyl, $R^6$ represents hydrogen, unsubstituted or substituted $C_{1-18}$ alkyl, substituted or unsubstituted $C_{3-8}$ cycloalkyl, substituted or unsubstituted $C_{6-10}$ aryl, unsubstituted or substituted aralkyl wherein the aryl portion contains 6–10 carbons and the alkyl portion contains 1–6 carbon atoms, substituted groups having one or more substituents selected from the group consisting of $C_{1-4}$ alkyl groups, halogen atoms, hydroxy groups, $C_{1-4}$ alkoxy groups, carboxy groups, nitro groups, $C_{6-10}$ aryl groups, cyano groups, $C_{6-10}$ aryloxy groups and $C_{6-10}$-aryl-$C_{1-4}$-alkyl groups. Suitable examples of $R^6$ include the N-substituents of the maleimide type monomers described hereinafter.

In the sub-units of formula (IV), when X is a single bond, $R^4$ and $R^5$ are preferably both hydrogen and, when X is a methylene group, $R^4$ and $R^5$ are preferably the same. It is preferred that X is a single bond.

$R^6$ preferably represents hydrogen, $C_{1-18}$ alkyl, $C_{3-6}$ cycloalkyl, phenyl or phenyl substituted with $C_{1-4}$ alkyl, halogen, hydroxy, $C_{1-4}$ alkoxy, carboxy, nitro, phenyl, naphthyl, cyano, phenoxy, naphthyloxy or $C_{1-4}$ alkylphenyl groups. More preferably, $R^6$ represents hydrogen, $C_{1-6}$ alkyl, cyclohexyl, phenyl or tolyl, particularly hydrogen, cyclohexyl or phenyl, and especially hydrogen or phenyl.

The present invention preferably provides resin compositions comprising:

(A) 0.005 to 6 parts by weight of a hindered amine stabilizer of general formula (I),

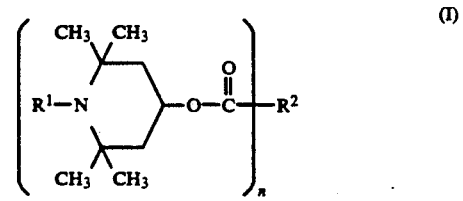

[wherein, $R^1$ represents a hydrogen atom or a methyl group, $R^2$ represents a mono- to tetra-valent hydrocarbon group having 1 to 20 carbon atoms which may also be interrupted with a nitrogen atom, and n represents an interger of 1 to 4], (B) 0.005 to 6 parts by weight of a hindered-phenol-hindered amine stabilizer of the general formula (II) and/or (III),

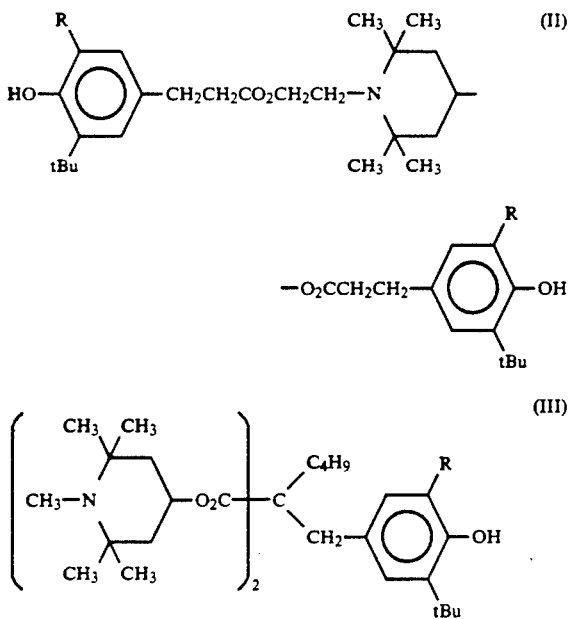

[wherein, R represents a methyl group or a t-butyl group], and (C) 0.01 to 5 parts by weight of a UV absorber, per 100 parts of the composition, the composition comprising a copolymer having 5 to 90% by weight of a sub-unit of formula (IV) as defined above.

The resin compositions of the invention overcome the above problems, and are discolored little, or not at all, under conditions of high temperature molding and intense light. What is particularly marked, is that the compositions of the invention are vastly superior to those possessing only two of the components (A)-(C).

Suitable preparations of compounds (I), (II) and (III) are generally commercially available, and may also be prepared in accordance with the disclosures of, for example, GB-A-1266035, EP-A-13 443 and GB-A-1516780, respectively.

UV absorbers are also well known in the art, and any may be used as appropriate, although the benzotriazole type is preferred.

Suitable maleimide type monomers for copolymers containing the sub-unit of formula (IV) wherein X represents a single bond include: maleimide; α-methylmaleimide; α,β-dimethylmaleimide; N-C$_{1-18}$ alkylmaleimides (such as N-methylmaleimide, N-ethylmaleimide, N-propylmaleimide, N-isopropylmaleimide, N-butylmaleimide, N-hexylmaleimide, N-octylmaleimide, N-laurylmaleimide and N-octadecylmaleimide); N-C$_{3-6}$ cycloalkylmaleimides (such as N-cyclopropylmaleimide, N-cyclopentylmaleimide and N-cyclohexylmaleimide); α-methyl-N-cyclohexylmaleimide; α,β-dimethyl-N-cyclohexylmaleimide; N-phenylmaleimide; α-methyl-N-phenylmaleimide; α,β-dimethyl-N-phenylmaleimide; and N-substituted phenylmaleimides wherein the phenyl ring is substituted with one or more substituents selected from C$_{1-4}$ alkyl (for example, methyl, ethyl, propyl or butyl), halogen (for example, fluoro, chloro and bromo), hydroxy, C$_{1-4}$ alkoxy (such as methoxy, ethoxy, propoxy or butoxy), carboxy, nitro, aryl (such as phenyl or naphthyl), cyano, aryloxy (such as phenoxy or naphthyloxy), and phenyl-C$_{1-4}$-alkyl groups (such as benzyl and phenethyl). These may be used either singly or in combination (two or more).

Specific examples of suitable N-(substituted phenyl) maleimide monomers include; N-tolylmaleimide, N-ethylphenylmaleimide, N-butylphenylmaleimide, N-dimethylphenylmaleimide, N-chlorophenylmaleimide, N-bromophenylmaleimide, N-dichlorophenylmaleimide, N-dibromophenylmaleimide, N-trichloromaleimide, N-tribromomaleimide, N-hydroxyphenylmaleimide, N-methoxyphenylmaleimide, N-carboxyphenylmaleimide, N-nitrophenylmaleimide, N-biphenylmaleimide, N-naphthylphenylmaleimide, N-cyanophenylmaleimide, N-phenoxyphenylmaleimide, N-benzylphenylmaleimide, N-(methyl-chlorophenyl) maleimide, N-(methoxychlorophenyl)maleimide.

Particularly preferred monomers for copolymers having a sub-unit of formula (IV) wherein X is a single bond are monomers in which both of R$^4$ and R$^5$ are hydrogen, more preferably, maleimide, N-C$_{1-6}$ alkylmaleimide, N-cyclohexylmaleimide, N-phenylmaleimide, N-tolylmaleimide, especially maleimide, N-cyclohexylmaleimide, N-phenylmaleimide and N-tolylmaleimide.

Comonomers do not form an essential feature of the present invention, but are preferably selected from aromatic vinyl type monomers, unsaturated nitrile type monomers, unsaturated carboxylic acids (including their ester type monomers) and olefinic monomers. Again, these may be used singly or in combination (two or more).

Suitable examples of aromatic vinyl type comonomers include; styrene, α-methylstyrene, α-chlorostyrene, p-t-butylstyrene, p-methylstyrene, o-chlorostyrene, p-chlorostyrene, 2,5-dichlorostyrene, 3,4-dichlorostyrene, p-bromostyrene, o-bromostyrene, 2,5-dibromostyrene and 3,4-dibromostyrene, preferably styrene and α-methylstyrene. These can be used either singly or in combination of two or more compounds.

Examples of unsaturated nitrile type comonomers include acrylonitrile, methacrylonitrile, maleonitrile and fumaronitrile, preferably acrylonitrile. Again, these may be used singly, or in combination.

Suitable examples of carboxylic acids and their esters as comonomers include: acrylic acid, methacrylic acid and their esters (such as methyl, ethyl, propyl, butyl, octyl, lauryl, cyclohexyl, 2-hydroxyethyl, glycidyl and dimethylaminoethyl esters); dicarboxylic acids (such as maleic acid, itaconic acid, citraconic acid and hymic acid) and their monoalkyl or dialkyl esters (such as monomethyl, dimethyl, monoethyl, methylethyl, monopropyl, dipropyl, monobutyl and dibutyl esters); and acid anhydrides (such as maleic anhydride, itaconic anhydride, citraconic anhydride and hymic anhydride); preferably methacrylic acid, methyl methacrylate and maleic anhydride. These may be used either singly or in combination of two or more compounds.

Suitable examples of olefinic comonomers include ethylene, propylene, but-1-ene, isoprene, pent-1-ene and 4-methylpent-1-ene.

As used herein, the term "maleimide type" includes reference to graft copolymers having 5 to 90% by weight of a sub-unit of formula (IV), based on the total amount of the polymer components.

Suitable rubbery polymers to form a graft copolymer include: polybutadiene, styrene-butadiene random or block copolymers, hydrogenated styrene-butadiene random or block copolymers, acrylonitrile-butadiene copolymers, Neoprene rubber, chloroprene rubber, isobutylene rubber, natural rubber, ethylene-propylene rubbers, ethylene-propylene-nonconjugated diene rubbers, chlorinated polyethylenes, chlorinated ethylene-propylene-nonconjugated diene rubbers, acrylic rubbers, ethylene-vinyl acetate copolymers, ethylene-acrylic acid or methacrylic acid ester (such as methyl, ethyl, butyl, glycidyl and dimethylamino ethyl esters) copolymers, ethylene-vinyl acetate-glycidyl methacrylate copolymers, ethylene-methyl acrylate-glycidyl methacrylate copolymers, polyvinyl butyral, polyester elastomers and polyamide elastomers. These may be used crosslinked or uncrosslinked, as may be mixtures of two or more.

Of the above-mentioned copolymers, the most preferred are polybutadiene, styrene-butadiene random or block copolymers, ethylene-propylene rubbers, ethylene-propylene-nonconjugated diene rubber, acrylic rubbers, particularly polybutadiene and styrene-butadiene random or block copolymers.

The ratio of sub-units of formula (IV) to other units in the copolymer is preferably from about 5% to about 90% by weight for heat resistance and workability, more preferably about 10% to about 80%, particularly about 20% to about 70%.

A copolymer containing the sub-units of formula (IV) may be prepared by any suitable method known in the art. In general, when X represents a single bond, the imide monomer may be polymerized directly, or the free acid or anhydride used, followed by treatment with a suitable imidating agent, such as a compound of formula $$NH_2R^6 \qquad (V)$$

(wherein $R^6$ is as defined). Other suitable imidating agents include isocyanic esters.

Where the copolymer to be prepared contains sub-units of formula (IV) wherein X represents methylene, then such a polymer may be prepared by the polymerization of a corresponding acid or anhydride, followed by imidation as above. However, the most economic technique is to polymerize methacrylic acid, acrylic acid, or a mixture thereof, according to whether $R^4$ and $R^5$ are both methyl, both hydrogen, or a hydrogen and methyl, respectively. The resulting polymer may then be imidated.

Copolymers may be directly copolymerized in the presence or absence of a rubbery polymer. Suitable polymerization techniques include: bulk polymerization; suspension polymerization; bulk-suspension polymerization; emulsion polymerization; and solution polymerization.

Suitable polymers for blending with the polymers containing sub-unit (IV) of the present invention include: polystyrene, impact-resistant polystyrene, acrylonitrile-styrene copolymer and acrylonitrile-butadiene-styrene copolymer (ABS type resin). The ABS copolymer may comprise 5 to 90 parts by weight (preferably 10 to 80 parts by weight, especially 25 to 75 parts by weight) of a rubber elastomer, 5 to 90 parts by weight (preferably 10 to 80 parts by weight, especially 10 to 70 parts by weight) of an aromatic vinyl monomer, 0 to 90 parts by weight (preferably 5 to 70 parts by weight, especially 5 to 50 parts by weight) of an α,β-unsaturated nitrile type monomer, and generally 0 to 85 parts by weight of other, suitable comonomers copolymerizable therewith.

A suitable proportion of the blending polymer is anywhere from about 0% to about 90%, preferably from about 20% to about 80%, and any proportion may be used according to requirements.

Suitable rubbery elastomers include: polybutadiene, styrene-butadiene copolymers, hydrogenated styrene-butadiene copolymers, acrylonitrile-butadiene copolymers, Neoprene rubber, chloroprene rubber, isobutylene rubber, ethylene-propylene rubber, ethylene-propylene-unconjugated diene rubber, chlorinated polyethylene, chlorinated ethylene-propylene unconjugated diene rubber, acrylic rubber and ethylene-vinyl acetate copolymers. Preferable elastomers include: polybutadiene, styrene-butadiene copolymers, acrylic rubber, chlorinated polyethylene, ethylene-propylene rubber and ethylene-propylene-unconjugated diene rubber, especially polybutadiene rubber and styrene-butadiene copolymers.

Suitable aromatic vinyl type monomers include those mentioned above, especially styrene and α-methyl-styrene. These may be used singly or in combination, as before.

Suitable examples of α,β-unsaturated nitrile type monomers include acrylonitrile, methacrylonitrile, maleonitrile and fumaronitrile, especially acrylonitrile. These may be used either singly or in combination, as above.

Suitable comonomers copolymerizable with the above monomers include: unsaturated carboxylic acids, including their esters (such as acrylic acid, methacrylic acid and their esters, including methyl, ethyl, propyl, butyl, octyl, lauryl, cyclohexyl, 2-hydroxyethyl, glycidyl and dimethylaminoethyl esters); dicarboxylic acids (such as maleic acid, itaconic acid, citraconic acid and hymic acid) and their monoalkyl or dialkyl esters (such as monomethyl, dimethyl, monoethyl, diethyl, monobutyl and dibutyl esters); and acid anhydrides (such as maleic anhydride, itaconic anhydride, citraconic anhydride and hymic anhydride). The most preferable of these are methacrylic acid, methyl methacrylate and maleic anhydride. These may be used either singly or in combination, as above.

Other suitable comonomers include olefinic monomers such as ethylene, propylene, but-1-ene, isoprene, pent-1-ene, 4-methylpent-1-ene and butadiene.

The most preferable polymers for blending in the resins of the present invention are ABS copolymers, copolymers having acrylonitrile and styrene graft-polymerized onto acrylic rubber and copolymers of chlorinated polyethylene copolymerized with acrylonitrile and styrene. Particularly preferred are ABS copolymers, particularly when prepared by the graft method.

Suitable compounds useful as the hindered amine type stabilizer of formula (I) are as follows.

When n is 1, $R^2$ may represent, for example: an alkyl group having 1 to 18 carbon atoms (such as methyl, ethyl, propyl, isopropyl, butyl, s-butyl, pentyl, hexyl, heptyl, octyl, 2-ethylhexyl, nonyl, decyl, undecyl, dodecyl, tetradecyl, heptadecyl and octadecyl); or a phenyl group optionally substituted with one or more substituents selected from alkyl groups having 1 to 4 carbon atoms (such as methyl, ethyl, propyl or butyl), alkoxy groups having 1 to 4 carbon atoms (such as methoxy, ethoxy, propoxy, butoxy) and halogen atoms (such as fluorine, chlorine, bromine). $R^2$ is preferably an alkyl group having 11 to 17 carbon atoms or a phenyl group.

When n is 2, $R^2$ may represent, for example, an alkylene group having 2 to 20 carbon atoms, such as ethylene, propylene, butylene, pentamethylene, hexamethylene, heptamethylene, octamethylene, nonamethylene, decamethylene, dodecamethylene, hexadecamethylene, octadecamethylene, nonadecamethylene or eicosamethylene. Preferred is an alkylene group having 2 to 10 carbon atoms.

When n is 3, $R^2$ may represent, for example, an alkanetriyl group having 3 to 8 carbon atoms, such as one of the following:

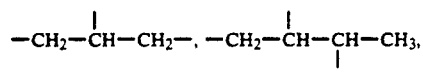

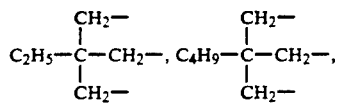

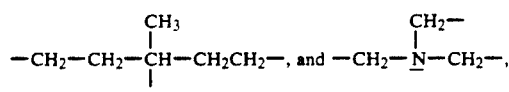

preferably groups of the formula:

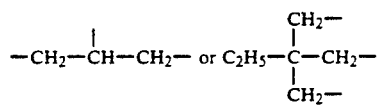

and, when n is 4, $R^2$ may represent an alkanetetrayl group having 4 to 5 carbon atoms, such as:

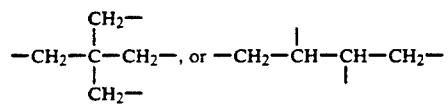

preferably: 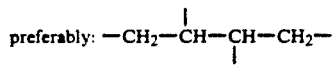

Those compounds wherein n is 2 and $R^2$ is an alkylene group having 2 to 10 carbon atoms and those compounds wherein n is 4 and $R^2$ is:

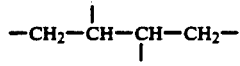

are preferred, especially those compounds wherein n is 2 and $R^2$ is an alkylene group having 2 to 10 carbon atoms.

Compounds of formula (I') are also suitable for use as the hindered amine type stabilizer:

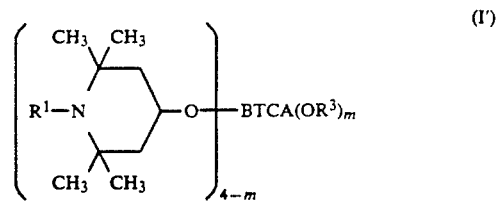

wherein $R^1$ is as defined above, $R^3$ represents an alkyl group having 1 to 18 carbon atoms (such as the examples given hereinbefore), BTCA represents a butanetetracarboxylic acid residue, and m is a number between 1 and 2. Particularly preferred are those compounds wherein $R^1$ is hydrogen or methyl, $R^3$ is an alkyl group having 8 to 15 carbon atoms, and m is 1.7.

Component (B) may comprise one or both of the compounds of formulae (II) and (III) in which preferably R represents a t-butyl group. It is preferred that component (B) comprises the compound of formula (II) alone.

Examples of suitable UV absorbers for use in accordance with the present invention include: 2-(2'-hydroxyphenyl)-benzotriazole derivatives (wherein the substituents may be selected from, for example, such as 5'-methyl-, 5'-t-butyl, 3',5'-di-t-butyl-, 5'-(1,1,3,3-tetramethylbutyl)-, 5-chloro-3',5'-di-t-butyl-, 5-chloro-3'-t-butyl-5'-methyl-, 3'-s-butyl-5'-t-butyl, 4'-octoxy-, 3',5'-di-t-amyl- and 3',5'-bis(α,α-dimethylbenzyl)-groups); 2-hydroxybenzophenone derivatives (wherein the substituents may be selected from, for example, 4-hydroxy, 4-methoxy-, 4-octoxy-, 4-decyloxy-, 4-dodecyloxy-, 4-benzyloxy-, 4,2',4'-trihydroxy- and 2'-hydroxy-4,4'-dimethoxy- groups); and benzoic acid ester derivatives (such as 4-t-butyl-phenyl salicylate, phenyl salicylate, octylphenyl salicylate, dibenzoylresorcinol, bis(4-t-butylbenzoyl)resorcinol, benzoyl resorcinol, 3,5-di-t-butyl-4-hydroxybenzoic acid, 2,4-di-t-butylphenyl ester and hexadecyl 3,5-di-t-butyl-4-hydroxybenzoate).

Preferred UV absorbers are the 2-(2'-hydroxyphenyl)benzotriazole derivatives and benzophenone derivatives, especially the 2-(2'-hydroxyphenyl)-benzotriazole derivatives, and particularly preferred are 2-(2'-hydroxy-5'-methylphenyl)-benzotriazole, and 2-(2'-hydroxy-3',5'-bis(α,α-dimethylbenzylphenyl)-benzotriazole.

The amounts of the amine stabilizers necessary (components (A) and (B)), will vary according to the application for which the resin is intended and also with other factors, such as the other constituents of the composition, especially other stabilizers. Suitable quantities will be readily apparent to those skilled in the art. However, generally, based on the weight of the copolymer, suitable amounts of components (A) and (B) are about 0.005 to about 6% by weight, preferably about 0.01 to about 5% by weight, more preferably about 0.05 to about 3% by weight, and especially about 0.1 to about 1% by weight.

A suitable amount of the UV absorber (component (C)) will generally be in the region of about 0.01 to about 5% by weight based on the weight of the copolymer, preferably about 0.02 to about 3% by weight, especially about 0.1 to about 1% by weight.

The resin compositions of the present invention may also contain various other suitable additives known in the art of polymer technology. Some non-limiting examples are as follows:

1. PHENOL TYPE ANTIOXIDANTS (1) 3-(3,5-di-t-butyl-4-hydroxyphenyl)propionic acid esters The methanol, octadecanol, 1,6-hexanediol, neopentyl glycol, thiodiethylene glycol, diethylene glycol, triethylene glycol, pentaerythritol, tris(hydroxyethyl)isocyanurate and N,N'-bis(hydroxyethyl)oxalic acid diamide esters.

(2) 3-(3-t-butyl-4-hydroxy-5-methylphenyl)propionic acid esters

The methanol, diethylene glycol, octadecanol, triethylene glycol, 1,6-hexanediol, pentaerythritol, neopentyl glycol, tris(hydroxyethyl)isocyanurate, thiodiethylene glycol and N,N'-bis(hydroxyethyl)oxalic acid diamide esters.

(3) 3-(3,5-dicyclohexyl-4-hydroxyphenyl)propionic acid esters

The methanol, octadecanol, 1,6-hexanediol, neopentyl glycol, thiodiethylene glycol, diethylene glycol, triethylene glycol, pentaerythritol, tris(hydroxyethyl)isocyanurate and N,N'-bis(hydroxyethyl)-oxalic acid diamide esters.

(4) 3-(3,5-di-t-butyl-4-hydroxyphenyl)propionic acid amide

N,N'-bis(3,5-di-t-butyl-4-hydroxyphenylpropionyl)hexamethylenediamine, N,N'-bis(3,5-di-t-butyl-4-hydroxyphenylpropionyl)trimethylenediamine, and N,N'-bis(3,5-di-t-butyl-4-hydroxyphenylpropionyl)hydrazine.

(5) Others 2,6-di-t-butyl-p-cresol; distearyl (4-hydroxy-3-methyl-5-t-butyl)benzylmalonate; 2,2'-methylenebis(4-methyl-6-t-butylphenol); 4,4'-methylenebis(2,6-di-t-butylphenol); 2,2'-methylenebis[6-(1-methylcyclohexyl)p-cresol]; bis[3,3-bis(4-hydroxy-3-t-butylphenyl)butyric acid]glycol ester; 4,4'-butylidenebis(6-t-butyl-m-cresol); 1,1,3-tris(2-methyl-4-hydroxy-5-t-butylphenyl)butane; 1,3,5-tris(3,5-di-t-butyl-4-hydroxybenzyl)-2,4,6-trimethylbenzene; 3,9-bis[1,1-dimethyl-2-(3,5-di-t-butyl-4-hydroxyphenyl)ethyl]-2,4,8,10-tetraoxaspiro-[5.5]undecane; 1,3,5-tris(3,5-di-t-butyl-4-hydroxybenzyl)isocyanurate and bis[3-(3,5-di-t-butyl-4-hydroxyphenyl)propionyl]oxamide.

2. PHOSPHITE AND PHOSPHONITE TYPE STABILIZERS tris(2,4-di-t-butylphenyl)phosphite, triphenylphosphite; tris(nonylphenyl)phosphite; distearylpentaerythritol diphosphite; 4,4-butylidenebis(3-methyl-6-t-butylphenyl-di-tridecyl)-phosphite; bis(2,4-di-t-butylphenyl)pentaerythritol diphosphite; tetrakis(2,4-di-t-butylphenyl)-4,4-biphenylene phosphonite and bis(2,6-di-t-butyl-4-methyl-phenyl)pentaerythritol diphosphite.

3. NICKEL TYPE STABILIZERS

Ni-monoethyl-3,5-di-t-butyl-4-hydroxybenzyl phosphonate; butylamine-Ni-2,2'-thiobis(4-t-octylphenolate) complex; Ni-dibutyl-dithiocarbamate; and Ni-3,5-di-t-butyl-4-hydroxybenzoate.

4. METAL SALTS OF HIGHER FATTY ACIDS

Calcium, magnesium, barium, zinc, cadmium and nickel stearates, and calcium, magnesium, cadmium, barium and zinc laurates.

Otherwise, if necessary, metal deactivating agents, organic tin compounds, epoxy compounds and thioether type peroxide decomposing agents may all be used as required, in any combination.

Other suitable additives include colorants, and useful pigments include: inorganic pigments such as titanium dioxide, ultramarine blue, red iron oxide, carbon black, cadmium yellow; organic pigments such as azo type (Chromophthal [trade mark] Yellow GR, Chromophthal [trade mark] Red BR), isoindolinone type (Irgazine [trade mark] Yellow-2 GLT), anthrone type (Chromophthal [trade mark] Yellow 6GL, Chromophthal [trade mark] Red A3B), phthalocyanine type (Phthalocyanine Blue B, Phthalocyanine Green 2YL), dioxazine type (PV Fast Violet BL, Chromophthal [trade mark] Violet B), perylene type (Heliogenmaloon G, Indanthrene Scarlet R), perinone type (Indanthrene Bordeau HRR, Perinon Red), quinophthalone type (Dialite Yellow GYGR) and dyes.

Other additives may include: reinforcing materials (such as glass fiber), fillers (such as talc, silica and calcium carbonate), inorganic/organic flame retardants, plasticizers, nucleation agents, antistatic agents, lubricants, foaming agents, pigment dispersing agents and antifungal agents in any suitable combination.

The present invention will now be further illustrated by reference to the following Examples which are not limiting of the invention. In the Examples and Preparation examples, unless otherwise noted, parts and percents are by weight.

PREPARATION EXAMPLE 1

Rubber-Reinforced Styrene Type Copolymer Resin (a)

A monomeric mixture (I) comprising 70 parts of styrene, 30 parts of acrylonitrile and 1.1 part of t-dodecylmercaptan (a molecular weight controller) was prepared.

Into a glass flask equipped with a stirring device, a reflux condenser, a thermometer and an aid addition device, 270 parts (including water) of a styrene-butadiene rubber latex (styrene content 10% by weight, rubber solid concentration 37% by weight and average rubber particle size 0.30 μm) and 100 parts of deionized water were charged, and the inner temperature brought to 70° C. with stirring under a stream of nitrogen. Ferrous sulfate (0.01 part—dissolved in a small amount of deionized water), 0.8 part of dextrose and 1 part of sodium pyrophosphate were added into the polymerization system.

Subsequently, into the flask, 25 parts of an aqueous dispersion of cumene hydroperoxide (CHPO) containing 0.5 part of CHPO were added, with stirring, over 180 minutes, the total amount of the monomeric mixture (I) being added continuously over 140 minutes, and the polymerization reaction initiated at the same temperature. After 120 minutes from the initiation of the polymerization reaction, 0.2 part of sodium dodecylbenzenesulfonate was added into the polymerization system. After initiation, the graft-polymerization reaction was continued at the same temperature for 210 minutes.

The latex obtained after completion of the graft-polymerization reaction was added dropwise into a 4% aqueous magnesium sulfate solution heated to 95° C. for salting-out, dehydrated and dried to give a powdery styrene type graft copolymer (a) (graft gel content 70% by weight).

PREPARATION EXAMPLE 2

Maleimide Type Copolymer Resin (b)

Into a pressure polymerization tank equipped with a condenser, a stirring device and a starting material aid feeding device were charged 690 parts of styrene and 19 parts of maleic anhydride, and the tank atmosphere was replaced with nitrogen. Under stirring, the inner temperature of the polymerization tank was brought to 95° C. to initiate the bulk polymerization reaction. One hundred parts of molten maleic anhydride liquid heated to 70° C. were added continuously at a constant rate into the polymerization system at 95° C. for 460 minutes after the initiation of polymerization. After this time, a viscous liquid with a polymerization degree of 44% by weight was obtained.

The viscous liquid was poured into a large excess of methanol to remove unreacted monomers, followed by drying, to give a styrene-maleic anhydride copolymer. Three hundred parts of the styrene-maleic anhydride copolymer obtained and 600 parts of xylene were charged, with stirring, into an autoclave equipped with a stirring device and a starting material aid feeding device, under a nitrogen atmosphere. The reaction system, which had become a uniform solution, was brought to 155° C., and 93 parts of aniline and 0.9 part of triethylamine were added into the autoclave to initiate the imidation reaction. For 240 minutes from the initiation of the reaction, the polymer imidation reaction was continued at the same temperature. The polymer solution obtained was poured into methanol to be precipitated, washed, filtered and dried to give a maleimide type copolymer resin (b).

The composition of the maleimide polymer resin (b) was analyzed by NMR and was found to comprise 57.6% by weight of the styrene component, 41.6% by weight of the N-phenylmaleimide component and 0.8% by weight of the maleic anhydride component.

EXAMPLES 1-3, COMPARATIVE EXAMPLES 1-5

To 50 parts by weight of the copolymer (a) obtained in Preparation Example 1 and 50 parts by weight of copolymer (b) obtained in Preparation Example 2 were added 0.3 part by weight of triethylene glycol bis[3-(3-t-butyl-5-methyl-4-hydroxyphenyl)propionate], 0.3 part by weight of ultramarine blue and various stabilizers (components (A)-(C), amounts shown below), and the mixture was melted and mixed through an extruder and formed into pellets, which were then injection-molded at 270° C. to prepare test plates having a thickness of 1 mm. The test plates were subjected to photoirradiation in a UV-ray fadometer (FAL-AU Model, Suga Shikenki K. K.) at a black panel temperature of 83° C. for 600 hours, followed by determination of Hunter color difference ΔE according to JIS Z8722. The results obtained are shown in Table 1.

TABLE 1

| No. | Stabilizer (parts by weight) | | | ΔE |
|---|---|---|---|---|
| | (a) | (b) | (c) | |
| Example | | | | |
| 1 | 0.25 | 0.25 | 0.2 | 3.4 |
| 2 | 0.5 | 0.25 | 0.2 | 2.8 |
| 3 | 0.25 | 0.5 | 0.2 | 3.1 |
| Comparative Example | | | | |
| 1 | 0.5 | — | 0.2 | 8.2 |
| 2 | 0.75 | — | 0.2 | 7.0 |
| 3 | — | 0.5 | 0.2 | 6.9 |
| 4 | — | 0.75 | 0.2 | 6.5 |
| 5 | — | — | — | 13.5 |

(a) bis(2,2,6,6-tetramethyl-4-piperidyl)sebacate
(b) 1-[2-[3-(3,5-di-t-butyl-4-hydroxyphenyl)-propionyloxy]-ethyl]-4-[3-(3,5-di-t-butyl-4-hydroxyphenyl)propionyloxy]-2,2,6,6-tetramethylpiperidine
(c) 2-(2'-hydroxy-5'-methylphenyl)benzotriazole

EXAMPLES 4-6, COMPARATIVE EXAMPLES 6-10

Test plates were prepared in the same manner as in Example 1, except that 0.3 part by weight of Anthraquinone Blue was used in place of Ultramarine Blue in Example 1, and subjected to photo-irradiation to determine ΔE. The results are shown in Table 2.

TABLE 2

| No. | Stabilizer (parts by weight) | | | ΔE |
|---|---|---|---|---|
| | (a) | (b) | (c) | |
| Example | | | | |
| 4 | 0.25 | 0.25 | 0.2 | 8.2 |
| 5 | 0.5 | 0.25 | 0.2 | 7.3 |
| 6 | 0.25 | 0.5 | 0.2 | 7.6 |
| Comparative Example | | | | |
| 6 | 0.5 | — | 0.2 | 20.1 |
| 7 | 0.75 | — | 0.2 | 18.8 |
| 8 | — | 0.5 | 0.2 | 18.3 |
| 9 | — | 0.75 | 0.2 | 16.7 |
| 10 | — | — | — | 26.4 |

What is claimed is:

1. A resin composition which is resistant to discoloration comprising:
   (A) 0.005 to 6 parts by weight of a hindered amine stabilizer of formula (I),

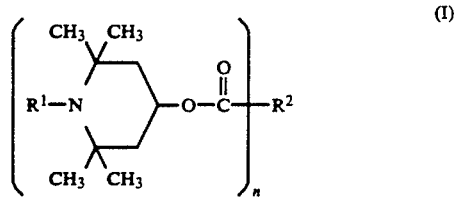

wherein, $R^1$ represents a hydrogen atom or a methyl group, $R^2$ represents a mono- to tetravalent hydrocarbon group having 1 to 20 carbon atoms which may also be interrupted with a nitrogen atom, and n represents an integer of 1 to 4,
   (B) 0.005 to 6 parts by weight of a hindered-phenol-hindered amine stabilizer of the formula (II) and/or (III),

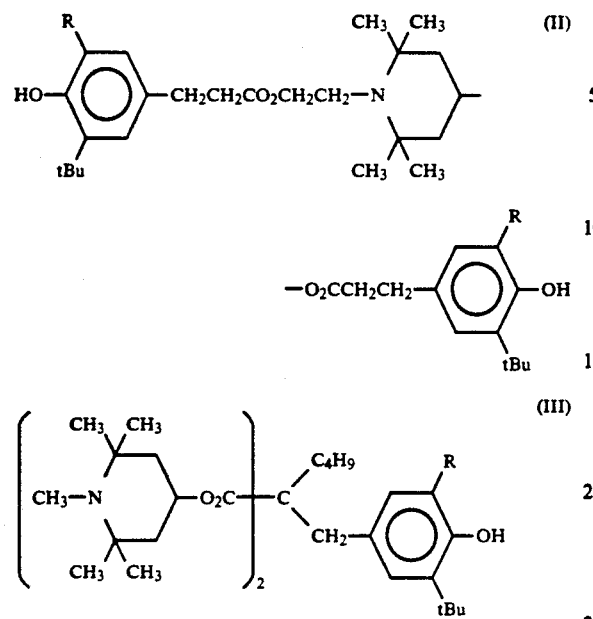

wherein, R represents a methyl group or a t-butyl group, and (C) 0.01 to 5 parts by weight of a UV absorber, per 100 parts of the composition, the composition further comprising a copolymer having 5 to 90% by weight of a sub-unit of formula (IV)

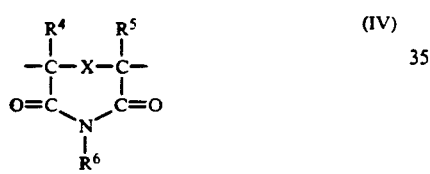

wherein X represents a single bond or a methylene group, $R^4$ and $R^5$ are the same or different, and each represents hydrogen or methyl, $R^6$ represents hydrogen, unsubstituted or substituted $C_{1-18}$ alkyl, substituted or unsubstituted $C_{3-8}$ cycloalkyl, substituted or unsubstituted $C_{6-10}$ aryl, unsubstituted or substituted aralkyl wherein the aryl portion contains 6-10 carbons and the alkyl portion contains 1-6 carbon atoms, substituted groups having one or more substituents selected from the group consisting of $C_{1-4}$ alkyl groups, halogen atoms, hydroxy groups, $C_{1-4}$ alkoxy groups, carboxy groups, nitro groups, $C_{6-10}$ aryl groups, cyano groups, $C_{6-10}$ aryloxy groups and $C_{6-10}$-aryl-$C_{1-4}$-alkyl groups.

2. The resin composition of claim 1, wherein said copolymer is a graft copolymer with a rubbery polymer.

3. The resin composition of claim 1, wherein the ratio of sub-units of formula (IV) to other units in the copolymer is from about 10% to about 80% by weight.

4. The resin composition of claim 1, wherein the ratio of sub-units of formula (IV) to other units in the copolymer is from about 20% to about 70% by weight.

5. The resin composition of claim 1, wherein said copolymer contains a further polymer blended therewith in a mix of between about 0 and about 90%.

6. The resin composition of claim 1, wherein $R^2$ in said compound of formula (I) represents:

when n is 1, an alkyl group having 1 to 18 carbon atoms; or a phenyl group unsubstituted or substituted with one or more substituents selected from the group consisting of alkyl groups having 1 to 4 carbon atoms, alkoxy groups having 1 to 4 carbon atoms and halogen atoms;

when n is 2, an alkylene group having 2 to 20 carbon atoms;

when n is 3, an alkanetriyl group having 3 to 8 carbon atoms, and when n is 4, an alkanetetrayl group having 4 to 5 carbon atoms.

7. The resin composition of claim 6, wherein:

when n is 1, $R^2$ represents an alkyl group having 11 to 17 carbon atoms or a phenyl group;

when n is 2, $R^2$ represents an alkylene group having 2 to 10 carbon atoms;

when n is 3, $R^2$ represents a radical selected from the group consisting of:

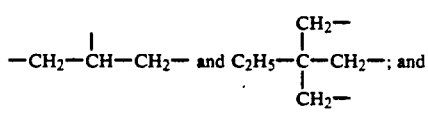

when n is 4, $R^2$ represents

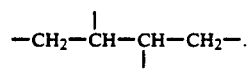

8. The resin composition of claim 6, wherein n is 2 and $R^2$ is an alkylene group having 2 to 10 carbon atoms.

9. The resin composition of claim 6, wherein n is 4 and $R^2$ represents:

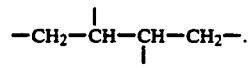

10. The resin composition of claim 6, wherein $R^2$ is selected from the group consisting of

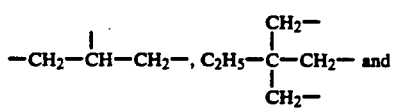

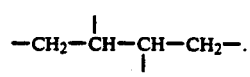

11. The resin composition of claim 1, wherein the compound of formula (I) has the formula (I')

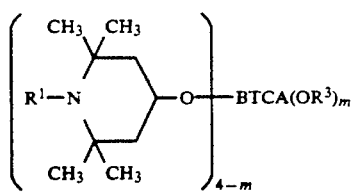

(I')

wherein $R^1$ is as defined in claim 5, $R^3$ represents an alkyl group having 1 to 18 carbon atoms, BTCA represents a butanetetracarboxylic acid residue, and m is a number between 1 and 2.

12. The resin composition of claim 11, wherein $R^1$ is hydrogen or methyl, $R^3$ is an alkyl group having 8 to 15 carbon atoms, and m is 1.7.

13. The resin composition of claim 1, wherein said hindered-phenol-hindered amine stabilizer is said compound of formula (II).

14. The resin composition of claim 1, wherein said UV absorber is selected from the group consisting of 2-(2'-hydroxyphenyl)-benzotriazole derivatives and benzophenone derivatives.

15. The resin composition of claim 1, wherein said UV absorber is 2-(2'-hydroxy-3',5'-bis(α,α-dimethylbenzylphenyl)-benzotriazole.

16. The resin composition of claim 1, wherein the amounts of said components (A) and (B) are about 0.01 to about 5% by weight.

17. The resin composition of claim 1, wherein the amounts of said components (A) and (B) are about 0.05 to about 3% by weight.

18. The resin composition of claim 1, wherein the amounts of said components (A) and (B) are about 0.1 to about 1% by weight.

19. The resin composition of claim 1, wherein the amount of said UV absorber is about 0.02 to about 3% by weight.

20. The resin composition of claim 1, wherein the amount of said UV absorber is about 0.1 to about 1% by weight.

21. The resin composition of claim 1, further comprising at least one additive selected from the group consisting of phenol type antioxidants; phosphite and phosphonite type stabilizers; nickel type stabilizers; metal salts of higher fatty acids; metal deactivating agents; organic tin compounds; epoxy compounds; thioether type peroxide decomposing agents; colorants; reinforcing materials; fillers; inorganic and organic flame retardants; plasticizers; nucleation agents; antistatic agents; lubricants; foaming agents; pigment dispersing agents and antifungal agents.

22. The resin composition of claim 1, wherein X in said sub-unit of formula (IV) represents a single bond.

23. The resin composition of claim 1, wherein X in said sub-unit of formula (IV) represents a single bond and both of $R^4$ and $R^5$ are hydrogen.

24. The resin composition of claim 1, wherein $R^6$ in said sub-unit of formula (IV) represents hydrogen, $C_{1-18}$ alkyl, $C_{3-6}$ cycloalkyl, phenyl or phenyl substituted with $C_{1-4}$ alkyl, halogen, hydroxy, $C_{1-4}$ alkoxy, carboxy, nitro, phenyl, naphthyl, cyano, phenoxy, naphthyloxy or $C_{1-4}$ alkylphenyl groups.

25. The resin composition of claim 1, wherein $R^6$ in said sub-unit of formula (IV) represents hydrogen, $C_{1-6}$ alkyl, cyclohexyl, phenyl or tolyl.

26. The resin composition of claim 1, wherein said hindered amine stabilizer is bis(2,2,6,6-tetramethyl-4-piperidyl)sebacate.

27. The resin composition of claim 1, wherein said hindered-phenol-hindered amine stabilizer is bis(1,2,2,6,6-pentamethyl-4-piperidyl)t-butyl-(3,5-di-t-butyl-4-hydroxybenzyl)malonate.

28. The resin composition of claim 1, wherein said hindered-phenol-hindered amine stabilizer is 1-(2-(3-(3,5-di-t-butyl-4-hydroxyphenyl)-propionyloxy)-ethyl)-4-(3-(3,5-di-t-butyl-4-hydroxyphenyl)propionyloxy)-2,2,6,6-tetramethylpiperidine.

29. The resin composition of claim 1, wherein said UV absorber is 2-(2'-hydroxy-5'-methylphenyl)benzotriazole.

30. The resin composition of claim 1, wherein said hindered amine stabilizer is bis(2,2,6,6-tetramethyl-4-piperidyl)sebacate, said hindered-phenol-hindered amine stabilizer is 1-(2-(3-(3,5-di-t-butyl-4-hydroxyphenyl)-propionyloxy)-ethyl)-4-(3-(3,5-di-t-butyl-4-hydroxyphenyl)propionyloxy)-2,2,6,6-tetramethylpiperidine or bis(1,2,2,6,6-pentamethyl-4-piperidyl)t-butyl-(3,5-di-t-butyl-4-hydroxybenzyl)malonate and said UV absorber is 2-(2'-hydroxy-5'-methylphenyl)-benzotriazole or 2-(2'-hydroxy-3',5'-bis(α,α-dimethylbenzylphenyl))benzotriazole.

31. The resin composition of claim 1, wherein said hindered amine stabilizer is bis(2,2,6,6-tetramethyl-4-piperidyl)sebacate, said hindered-phenol-hindered amine stabilizer is 1-(2-(3-(3,5-di-t-butyl-4-hydroxyphenyl)-propionyloxy)-ethyl)-4-(3-(3,5-di-t-butyl-4-hydroxyphenyl)propionyloxy)-2,2,6,6-tetramethylpiperidine and said UV absorber is 2-(2'-hydroxy-5'-methylphenyl)-benzotriazole.

32. The resin composition of claim 1, wherein the sub-unit of formula (IV) is selected from the group consisting of maleimide, α-methylmaleimide, α,β-dimethylmaleimide, N-methylmaleimide, N-ethylmaleimide, N-propylmaleimide, N-isopropylmaleimide, N-butylmaleimide, N-hexylmaleimide, N-octylmaleimide, N-laurylmaleimide, N-octadecylmaleimide, N-cyclopropylmaleimide, N-cyclopentylmaleimide, N-cyclohexylmaleimide, α-methyl-N-cyclohexylmaleimide, α,β-dimethyl-N-cyclohexylmaleimide, N-phenylmaleimide, α-methyl-N-phenylmaleimide, α,β-dimethyl-N-phenylmaleimide, N-tolylmaleimide, N-ethylphenylmaleimide, N-butylphenylmaleimide, N-dimethylphenylmaleimide, N-chlorophenylmaleimide, N-bromophenylmaleimide, N-dichlorophenylmaleimide, N-dibromophenylmaleimide, N-trichloromaleimide, N-tribromomaleimide, N-hydroxyphenylmaleimide, N-methoxyphenylmaleimide, N-carboxyphenylmaleimide, N-nitrophenylmaleimide, N-biphenylmaleimide, N-naphthylphenylmaleimide, N-cyanophenylmaleimide, N-phenoxyphenylmaleimide, N-benzylphenylmaleimide, N-(methyl-chlorophenyl)maleimide and N-(methoxychlorophenyl)maleimide.

33. The resin composition of claim 5, wherein the copolymer comprises a comonomer selected from the group consisting of styrene, α-methylstyrene, α-chlorostyrene, p-t-butylstyrene, p-methylstyrene, o-chlorostyrene, p-chlorostyrene, 2,5-dichlorostyrene, 3,4-dichlorostyrene, p-bromostyrene, o-bromostyrene, 2,5-dibromostyrene, 3,4-dibromostyrene, acrylonitrile, methacrylonitrile, maleonitrile, fumaronitrile, acrylic acid, methacrylic acid, methyl methacrylate, maleic acid, itaconic acid, citraconic acid, hymic acid, maleic anhydride, itaconic anhydride, citraconic anhydride, hymic anhydride, ethylene, propylene, but-1-ene, isoprene, pent-1-ene and 4-methylpent-1-ene.

34. The resin composition of claim 2, wherein the rubbery polymer is selected from the group consisting of polybutadiene, styrene-butadiene random copolymers, styrene-butadiene block copolymers, hydrogenated styrene-butadiene random copolymers, hydrogenated styrene-butadiene block copolymers, acrylonitrile-butadiene copolymers, Neoprene rubber, chloroprene rubber, isobutylene rubber, natural rubber, ethylene-propylene rubbers, ethylene-propylene-nonconjugated diene rubbers, chlorinated polyethylenes, chlorinated ethylene-propylene-nonconjugated diene rubbers, acrylic rubbers, ethylene-acrylic acid copolymers, ethylene-methacrylic acid ester copolymers, ethylene-vinyl acetate-glycidyl methacrylate copolymers, ethylene-methyl acrylate-glycidyl methacrylate copolymers, polyvinyl butyral, polyester elastomers and polyamide elastomers.

35. The resin composition of claim 1, wherein $R^2$ in said compound of formula (I) is when n is 1, methyl, ethyl, propyl, isopropyl, butyl, s-butyl, pentyl, hexyl, heptyl, octyl, 2-ethylhexyl, nonyl, decyl, undecyl, dodecyl, tetradecyl, heptadecyl, a phenyl group unsubstituted or substituted with one or more substituents selected from the group consisting of methyl, ethyl, propyl or butyl, methoxy, ethoxy, propoxy, butoxy fluorine, chlorine and bromine, when n is 2, ethylene, propylene, butylene, pentamethylene, hexamethylene, heptamethylene, octamethylene, nonamethylene, decamethylene, dodecamethylene, hexadecamethylene, octadecamethylene, nonadecamethylene or eicosamethylene, when n is 3,

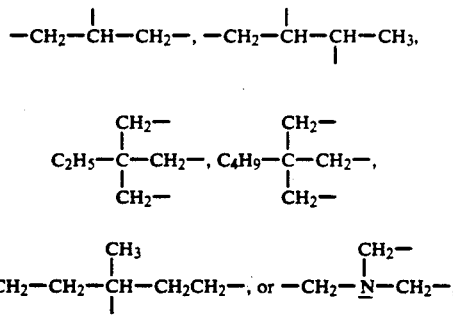

and when n is 4,

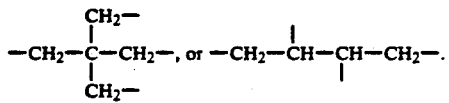

36. The resin composition of claim 32, wherein
the copolymer comprises a comonomer selected from the group consisting of styrene, α-methylstyrene, α-chlorostyrene, p-t-butylstyrene, p-methylstyrene, o-chlorostyrene, p-chlorostyrene, 2,5-dichlorostyrene, 3,4-dichlorostyrene, p-bromostyrene, o-bromostyrene, 2,5-dibromostyrene, 3,4-dibromostyrene, acrylonitrile, methacrylonitrile, maleonitrile, fumaronitrile, acrylic acid, methacrylic acid, methyl methacrylate, maleic acid, itaconic acid, citraconic acid, hymic acid, maleic anhydride, itaconic anhydride, citraconic anhydride, hymic anhydride, ethylene, propylene, but-1-ene, isoprene, pent-1-ene and 4-methylpent-1-ene; and said hindered amine stabilizer is bis(2,2,6,6-tetramethyl-4-piperidyl)sebacate, said hindered-phenol-hindered amine stabilizer is 1-(2-(3-(3,5-di-t-butyl-4-hydroxyphenyl)-propionyloxy)-ethyl)-4-(3-(3,5-di-t-butyl-4-hydroxyphenyl)propionyloxy)-2,2,6,6-tetramethylpiperidine or bis(1,2,2,6,6-pentamethyl-4-piperidyl)t-butyl-(3,5-di-t-butyl-4-hydroxybenzyl)malonate and said UV absorber is 2-(2'-hydroxy-5'-methylphenyl)benzotriazole or 2-(2'-hydroxy-3',5'-bis(α,α-dimethylbenzylphenyl))benzotriazole.

37. The resin composition of claim 36, wherein said copolymer is a graft copolymer with a rubbery polymer selected from the group consisting of polybutadiene, styrene-butadiene random copolymers, styrene-butadiene block copolymers, hydrogenated styrene-butadiene random copolymers, hydrogenated styrene-butadiene block copolymers, acrylonitrile-butadiene copolymers, Neoprene rubber, chloroprene rubber, isobutylene rubber, natural rubber, ethylene-propylene rubbers, ethylene-propylene-nonconjugated diene rubbers, chlorinated polyethylenes, chlorinated ethylene-propylene-nonconjugated diene rubbers, acrylic rubbers, ethylene-acrylic acid copolymers, ethylene-methacrylic acid ester copolymers, ethylene-vinyl acetate-glycidyl methacrylate copolymers, ethylene-methyl acrylate-glycidyl methacrylate copolymers, polyvinyl butyral, polyester elastomers and polyamide elastomers.

38. The resin composition of claim 36, wherein said hindered amine stabilizer is bis(2,2,6,6-tetramethyl-4-piperidyl)sebacate, said hindered-phenol-hindered amine stabilizer is 1-(2-(3-(3,5-di-t-butyl-4-hydroxyphenyl)-propionyloxy)-ethyl)-4-(3-(3,5-di-t-butyl-4-hydroxyphenyl)propionyloxy)-2,2,6,6-tetramethylpiperidine and said UV absorber is 2-(2'-hydroxy-5'-methylphenyl)-benzotriazole.

39. The resin composition of claim 37, wherein said hindered amine stabilizer is bis(2,2,6,6-tetramethyl-4-piperidyl)sebacate, said hindered-phenol-hindered amine stabilizer is 1-(2-(3-(3,5-di-t-butyl-4-hydroxyphenyl)-propionyloxy)-ethyl)-4-(3-(3,5-di-t-butyl-4-hydroxyphenyl)propionyloxy)-2,2,6,6-tetramethylpiperidine and said UV absorber is 2-(2'-hydroxy-5'-methylphenyl)-benzotriazole.

* * * * *

UNITED STATES PATENT AND TRADEMARK OFFICE
CERTIFICATE OF CORRECTION

PATENT NO. : 5,096,948

DATED : March 17, 1992

INVENTOR(S) : KURUMADA et al

It is certified that error appears in the above-identified patent and that said Letters Patent is hereby corrected as shown below:

```
Column 15, line 11 (Claim 11):  delete "claim 5" and
insert --claim 1--.

Column 16, line 58 (Claim 33):  delete "claim 5" and
insert --claim 1--.
```

Signed and Sealed this

Sixth Day of June, 1995

Attest:

BRUCE LEHMAN

*Attesting Officer*    Commissioner of Patents and Trademarks